Jan. 18, 1938.  C. T. CHRISTENSEN  2,105,584
SAND AND MUD SEPARATOR
Filed Oct. 2, 1935  3 Sheets-Sheet 1
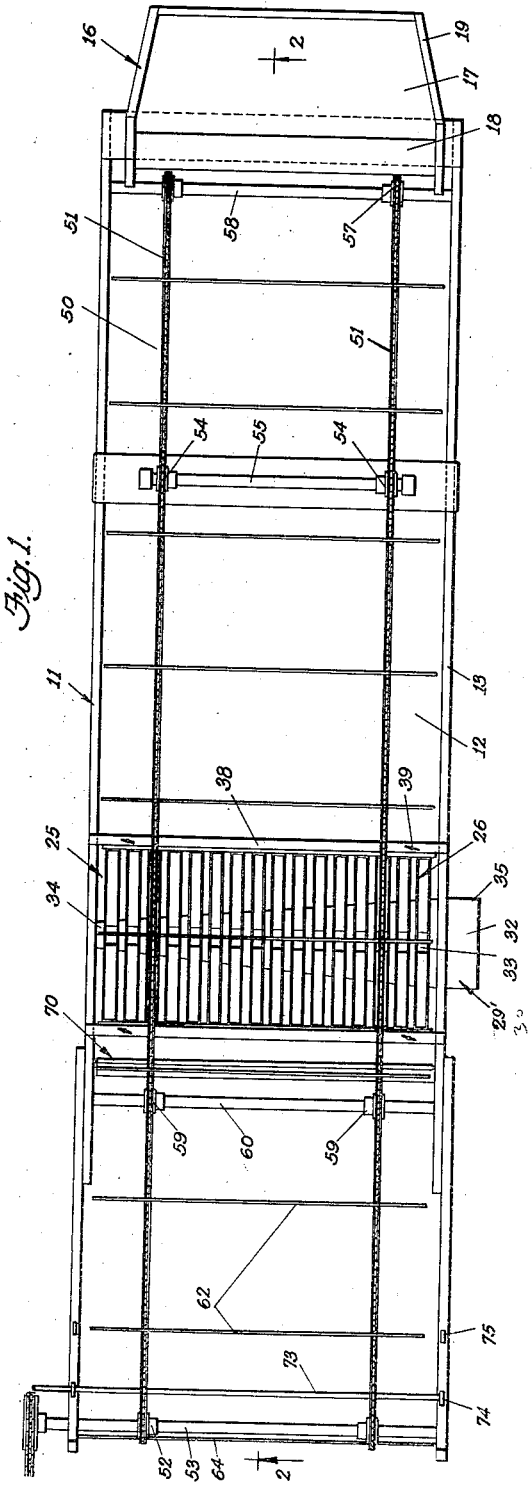
Inventor
C. T. Christensen
by Hazard and Miller
Attorneys.

Jan. 18, 1938.  C. T. CHRISTENSEN  2,105,584
SAND AND MUD SEPARATOR
Filed Oct. 2, 1935  3 Sheets-Sheet 2

Inventor
C. T. Christensen
by Hazard and Miller
Attorneys.

Jan. 18, 1938.   C. T. CHRISTENSEN   2,105,584
SAND AND MUD SEPARATOR
Filed Oct. 2, 1935   3 Sheets-Sheet 3

Inventor
C. T. Christensen
by Hazard and Miller
Attorneys.

Patented Jan. 18, 1938

2,105,584

UNITED STATES PATENT OFFICE 2,105,584

SAND AND MUD SEPARATOR

Chris T. Christensen, Alhambra, Calif., assignor, by decree of court, to Mary Theresia Christensen Application October 2, 1935, Serial No. 43,213

5 Claims. (Cl. 209—208)

My invention is specifically designed to separate mud from sand in hydraulic well drilling operations, in which the sand or cuttings are carried from the bottom of the hole or bore in preparations of mud and it is desirable to separate the sand from the mud to again use the mud in drilling.

My present invention may be considered as a further development of or improvement of my patent application Serial No. 665,923, filed April 13, 1933, for Sand and mud separator and mixer for well drilling, matured to Patent 2,078,752 dated April 27, 1937.

In my above mentioned patent application I provide a runoff shelf for the mud which has the function in part of skimming the surface mud from the main body of the mud and from the sand which deposits on the bottom of the trough or tank. My present invention relates to an improved apparatus and method for skimming the surface mud from an elongated tank containing a mixture of sand and mud, in which the sand is allowed to precipitate to the bottom and is then scraped out of the tank by a conveyor or the like. The bottom run of the conveyor operates underneath the skimming mechanism.

More specifically considered, an object and feature of my present invention consists of skimming the surface mud into a plurality of small parallel troughs, these being positioned longitudinally of the tank and spaced laterally one from the other. Thus the mud adjacent the surface flows or skims over the side edges of the individual trough, and only the mud which is thoroughly separated from the sand is skimmed off the tank for removal.

A further detailed feature consists of connecting each of the individual troughs to a mud discharge conduit or the like, this conduit being preferably located below the bottom of each individual trough and extending transversely across the tank having a discharge at one side of the tank.

A further detailed feature of my invention is providing each of the individual troughs with notches preferably V-shaped in the side edges, these notches forming skimming openings in the side of the individual troughs, forcing the surface mud to flow through the V-shaped side openings, the lower portion of such openings being a proper distance below the surface of the mud.

A further detailed feature embodies mounting the small troughs as a unit in a suitable frame and providing adjusting means to obtain an accurate regulation of the V-shaped notches in reference to the surface of the mud. In my construction I find it convenient to have the discharge conduit in the transverse center line of the individual troughs, so that these individual troughs have a forward and a rear end on opposite sides of the discharge conduit. The floors of each individual trough have a slope towards an opening in the top of the conduit. This conduit is preferably tapered with the widest portion at the discharge end at one side of the tank and has a suitable slope to discharge the mud.

Another detailed feature of my invention relates to the feeding of the sand and mud as received from the well. This employs a wide sloping chute and an apron descending at a steep angle, the apron leading to the feeding-in end of the tank. Thus the sand and mud is spread over the chute and the apron in a thin film and flows into one end of the tank, the flow carrying the sand and mud somewhat to the bottom of the tank where its abrupt change of course towards the skimmers tends to separate the heavy sand from the mud by centrifugal action. The sand is scraped along the bottom of the tank by endless chains having scraping slats, these in the lower run passing underneath the skimmer and the discharge chute and upwardly on an inclined end of the tank.

A further detail feature includes a construction at the discharge end for sand, for providing a jogging action of the scrapers to release the sand which might adhere to the scraping blade. I also provide brushes to brush the chain in its movement and spray either steam or water on the chain and if desired on the blades at the sloping discharge end to remove surplus mud from the blades and to remove sand from the chains and thus reduce the wear on the endless chains.

My invention is illustrated in the accompanying drawings, in which:

Fig. 1 is a plan taken in the direction of the arrow 1 of Fig. 2.

Fig. 2 is a longitudinal section on the line 2—2 of Fig. 1 in the direction of the arrows.

Figure 3:
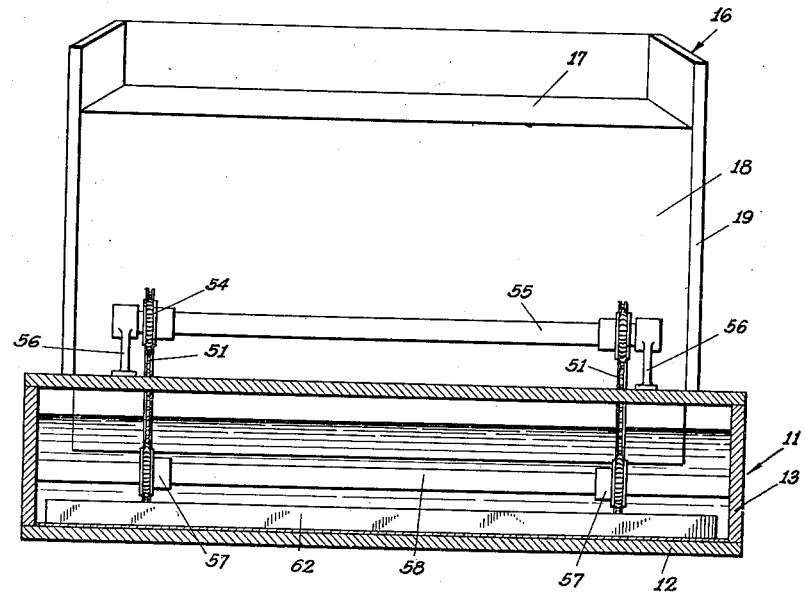
Fig. 3 is a transverse section on the line 3—3 of Fig. 2 in the direction of the arrows.
Figure 4:
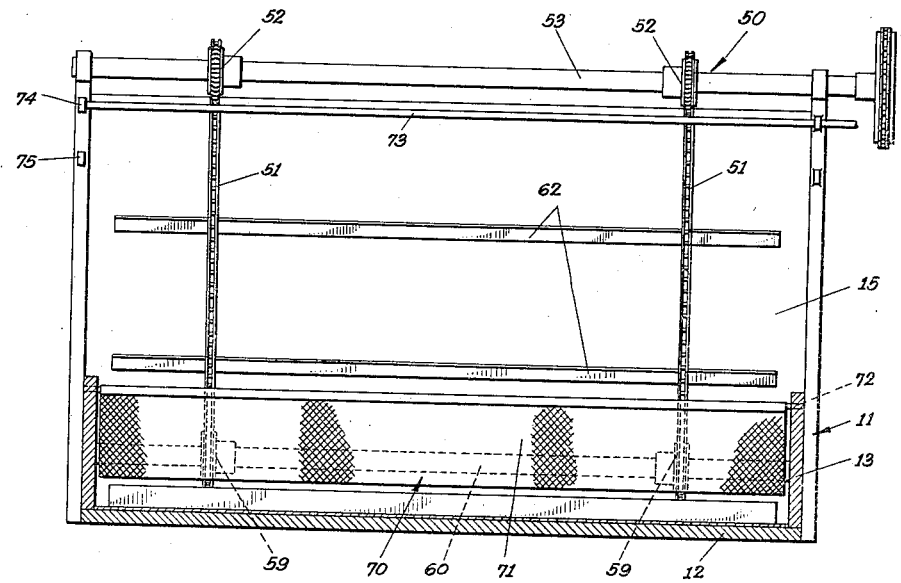
Fig. 4 is a transverse section on the line 4—4 of Fig. 2 in the direction of the arrows.

In my invention I employ an elongated tank 11 which has a floor 12, opposite sides 13, a vertical end 14, a sloping discharge end 15, this extending a considerable distance above the top of the sides 13. At the feeding end I employ a combination distributing chute and apron 16, this having a downwardly sloping chute 17 which expands laterally and a steeply inclined apron 18. These both have side walls 19 to confine the mud and sand as it is received from the well, but to allow the distribution in a comparatively thin film the apron has a metal cover with a depending end 20 extending below the surface of the mud and sand in the tank.

Figure 5:
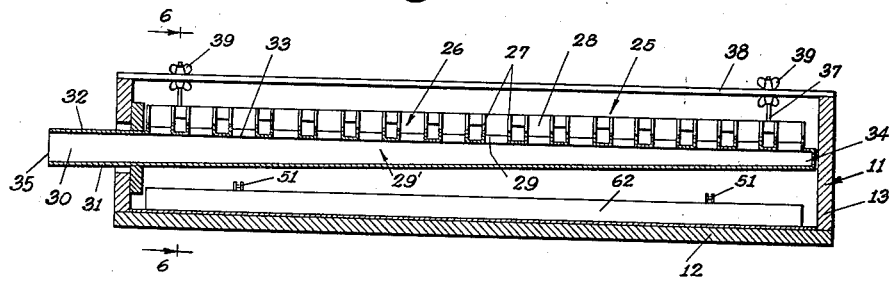
Fig. 5 is a detailed transverse section on the line 5—5 of Fig. 2 in the direction of the arrows.
Figure 7:
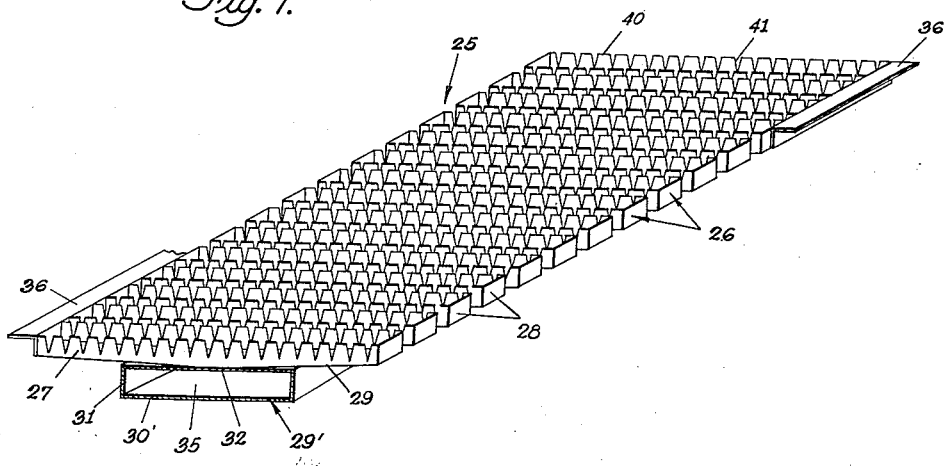
Fig. 7 is an isometric view of the assembly of the skimming troughs and the mud conduit.
Figure 6:
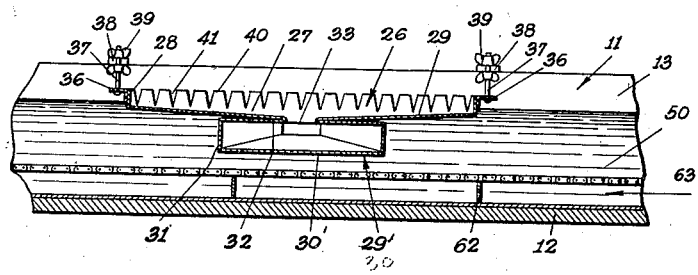
Fig. 6 is a longitudinal section on the line 6—6 of Fig. 5 in the direction of the arrows through one of the skimming troughs and the mud conduit.

The skimming assembly designated by the numeral 25 and illustrated particularly in Figs. 5, 6, and 7, utilizes a plurality of skimming troughs 26. These have parallel sides 27, end walls 28, and a sloping floor 29. The floor slopes to the center line of each trough. Each of the troughs is connected to a conduit 30, this conduit being illustrated as having a floor 30', opposite sides 31, a top 32, the top having a series of perforations or openings 33. The floor of the troughs discharges into these openings. It is preferable to make the conduit in the troughs of metal and the joint between the floor of the troughs and the openings of the conduit should be water tight.

The conduit has a narrow end, as indicated at 34, on one side of the tank, and a wide discharge end 35, the floor also having a slight slope, but the floor being spaced above the bottom 12 of the tank 11.

In order to adjust the elevation of the troughs I employ angle irons 36 attached to the opposite ends 28 of each of the troughs. This angle iron extends transversely across the tank. The whole assembly of troughs and the mud conduit is suspended by adjusting bolts 37 which are attached at their lower end to the angle irons 36 and passed through perforations in supporting bars 38 which bridge the tank between the sides 13. Thumb nuts 39 or the like are used to secure accurate leveling and locking of the assemblage of troughs.

If desired, the troughs may be made with horizontal upper edges 40 on the sides 27. However, I find it preferable to have a series of notches 41, this being illustrated as of a V-shape with the apex lowermost. The assembly of troughs is positioned so that the level of the mud in the main tank is at the desired elevation above the bottom of the notches so that the mud adjacent the surface is skimmed off the surface through these notches into each of the troughs. The troughs are spaced apart, as indicated at 41. I find a convenient measurement to be to have the troughs two inches wide and the spacing between the troughs one inch wide, the length of the troughs being dependent on the amount of mud to be removed, and of course on the width of the main tank in order to be able to handle a requisite amount of mud for the particular installation. The wide end 35 of the conduit is carried through an opening in one of the walls 13 in the main tank and after adjustment of the assembly of troughs and the conduit this opening should be caulked or made water tight. However, if desired, the end of the conduit passing through the side wall may be considered as fixed with a water tight joint and the troughs adjusted by means of the adjusting bolts to properly position the upper edges of the troughs parallel to the surface of the mud. If desired, the troughs may be given a slight inclination.

The sand which is precipitated from the sand and mud is scraped out of the tank by utilizing an endless conveyor 50. This has preferably two endless chains 51 passing over sprockets 52 on a drive shaft 53. The upper run is supported by sprockets 54 on a shaft 55, this being mounted on brackets 56 on opposite sides of the tank. A submerged set of sprockets 57 is on a shaft 58 mounted in the sides of the tank, this being adjacent the infeeding end. Another set of guide sprockets 59 are on a shaft 60 also journaled in the tank adjacent its discharge end and adjacent the corner 61 formed by the floor 12 and the sloping end 15. A series of scraper blades 62 is secured to the endless chains so that the blades on the lower run scrape longitudinally of the floor of the tank in the direction of the arrow 63, passing underneath the assemblage of troughs and mud conduit, the sand then being scraped upwardly on the sloping end 15. The upper end of this slope has a slight upturned rim 64 which causes a slight upward pressing of each blade and then a drop of the blade after it passes the projecting rim. This functions to loosen any sand which adheres to the blade and cause its discharge in proximity to the rim 64.

In order to restrict a flow of the mud, such as might be created by the blades on the lower end of the conveyor moving toward the sloping end, I provide a brush 70 formed of a heavy fabric strip 71 suspended from a transverse bar 72. The lower edge of this strip brushes the endless chains between the sprockets 59 and the skimmers. In order to clean the chains as well as wash mud from the sand and carry it up the inclined end 15 I provide a spray pipe 73 which may be supported in either of two or more sets of brackets 74 and 75. This provides jets of water or steam indicated at 76 directed downwardly onto the chains and also the upwardly moving blades.

The manner of operation and functioning of my invention is somewhat as follows:

The sand and mud which is fed from a well into the feeding-in arrangement is spread laterally by the chute 17 and descends on the front of the apron 18 in the form of a somewhat thin film of mud containing sand. This film receives an abrupt change of direction of movement at the feeding-in end of the tank which tends to separate the heavy particles of sand by centrifugal action. The mud with the suspended sand then has a slow flowing action toward the skimming troughs and in this slow motion sand is precipitated to the bottom of the tank and by the time the flowing liquid reaches the skimmers the mud adjacent the surface is properly desanded. Therefore, the surface mud is skimmed from the body of material in the tank and the sand which has been precipitated is scraped along the bottom of the tank underneath the skimming troughs and the discharge conduit for the mud. As the sand is scraped upwardly along the sloping end 15 the liquid also in parts scraped by the blades may flow backwardly into the tank. Moreover, the space of water from the jets, indicated at 76, to a certain extent dilutes any mud or liquid incorporated with the sand and causes the mud to flow toward the main body of the tank, the sand being scraped upwardly and discharged beyond the rim 64.

Various changes may be made in the details of construction without departing from the spirit or scope of the invention as defined by the appended claims.

I claim:

1. In a device as described, the combination of an elongated shallow tank, means to flow a liquid containing sand and mud into one end of the tank, a plurality of narrow skimming troughs spaced apart and the troughs extending longitudinally of the tank, a conduit connected to all of the troughs, the troughs having sides adapted for the overflow of desanded mud from adjacent the surface of the liquid in the tank, the desanded mud flowing from the troughs into the conduit, and means to discharge sand settling on the bottom of the tank from the tank.

2. In a device as claimed in claim 1, the troughs and the conduit being connected in an assembly, and means to adjust the position of the assembled troughs and conduit relative to the surface of the liquid in the tank.

3. In a device as claimed in claim 1, the means to flow the liquid into the tank comprising a shallow chute substantially the width of the tank, and a steep apron from the end of the chute into one end of the tank above the level of liquid in the tank.

4. In a device as described, the combination of an elongated tank having parallel sides, means to flow a liquid containing sand and mud into one end of the tank, means to discharge sand from the opposite end of the tank, a skimming assembly positioned between the ends of the tank and including a transverse conduit and a plurality of skimming troughs connected thereto, each trough having straight opposite parallel side walls, the walls of adjacent troughs being spaced apart for overflow of desanded mud from adjacent the surface of the liquid in the tank into the troughs and from the troughs to the conduit, the troughs extending longitudinally of the tank with their side walls parallel to the sides of the tank and parallel to the flow of liquid in the tank, each trough having a slope on the bottom to its connection to the conduit.

5. In a device as described, a tank, a skimming assembly comprising a conduit, a plurality of skimming troughs connected thereto, each trough having parallel sides and extending on opposite sides of the conduit, the troughs being spaced apart for flow of liquid between the troughs, the side walls of each trough having V-shaped notches for flow of liquid into the troughs, and means for positioning the assembly of troughs and the conduit to locate the upper edge of the troughs adjacent the surface of a liquid to be skimmed and the sides parallel to the flow of liquid in the tank.

CHRIS T. CHRISTENSEN.